United States Patent
Alexander, Jr.

[11] 3,835,947
[45] Sept. 17, 1974

[54] TORSION BAR STABILIZING SYSTEM FOR SNOWMOBILES

[75] Inventor: Charles F. Alexander, Jr., Oshkosh, Wis.

[73] Assignee: Brunswick Corporation, Skokie, Ill.

[22] Filed: Nov. 27, 1973

[21] Appl. No.: 419,345

[52] U.S. Cl. .............................. 180/5 R, 280/21 R
[51] Int. Cl............................................ B62m 27/02
[58] Field of Search .............................. 180/5–10; 280/21 A, 21 R

[56] References Cited
UNITED STATES PATENTS

| | | | |
|---|---|---|---|
| 2,914,126 | 11/1959 | Skullerud | 180/5 R |
| 3,583,507 | 6/1971 | Trautwein | 180/5 R |
| 3,674,103 | 7/1972 | Kiekhaefer | 180/5 R |
| 3,760,895 | 9/1973 | Martinmaas | 280/21 A X |

Primary Examiner—Richard J. Johnson
Attorney, Agent, or Firm—William G. Lawler, Jr.

[57] ABSTRACT

An anti-roll torsion bar stabilizing system for a snowmobile including a laterally disposed torsion bar attached to the frame including lever arms extending generally forwardly thereof. Links pivotally attach the torsion bar arms to the skis and angle inwardly of the skis so that the system reacts to both vertical and horizontal displacement of the skis during operation.

7 Claims, 6 Drawing Figures

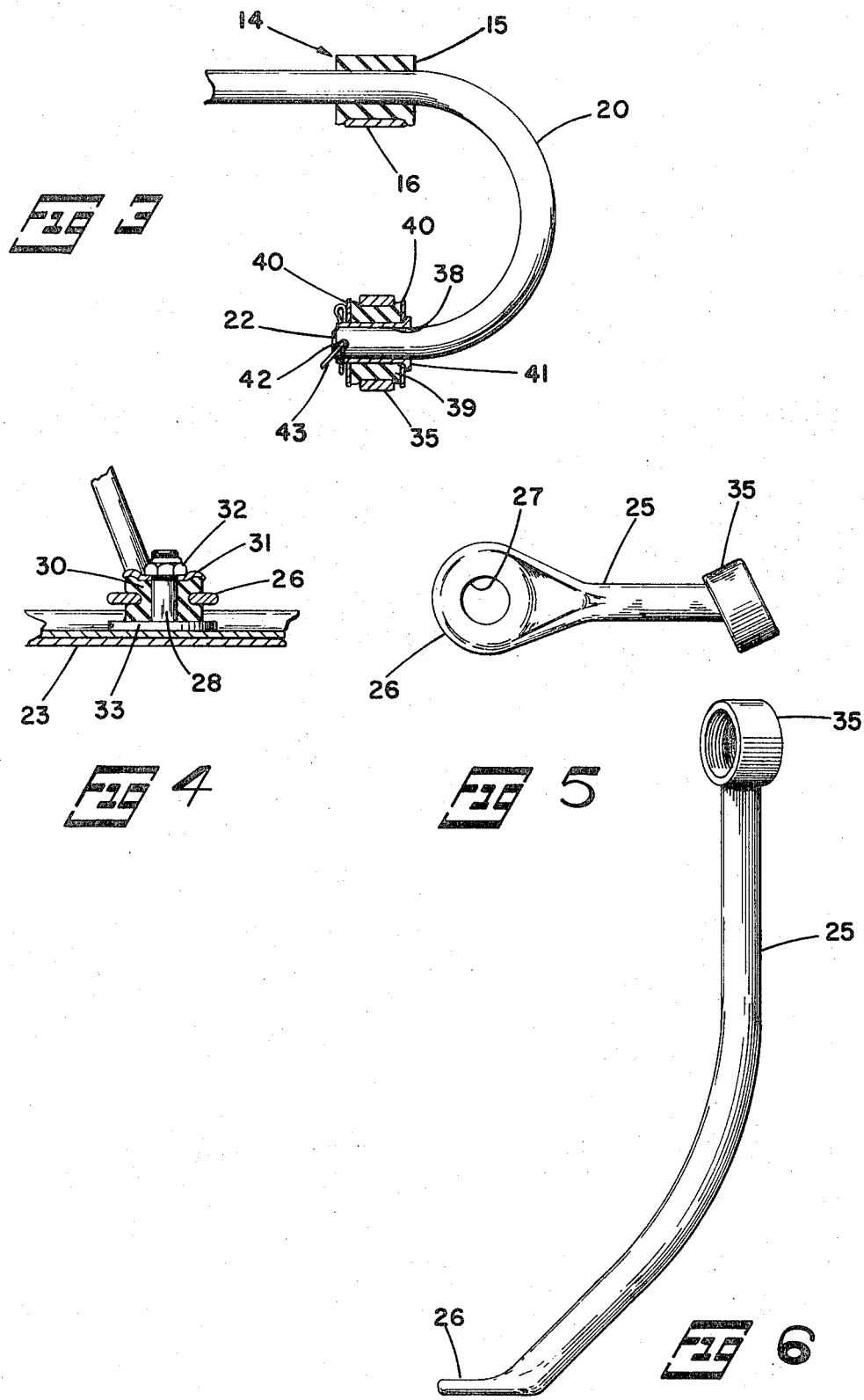

TORSION BAR STABILIZING SYSTEM FOR SNOWMOBILES

BACKGROUND OF THE INVENTION

The invention is in the field of suspension systems for snowmobiles and more specifically relates to an improved anti-roll torsion bar stabilizing system.

The first known application of a torsion bar to stabilize a snowmobile is disclosed in U.S. Pat. No. 3,674,103 to E. C. Kiekhaefer issued July 4, 1972. The invention herein greatly improves upon the Kiekhaefer configuration as will become apparent from a reading of the specification.

It is an objective of the invention to create a snowmobile suspension system that will provide both a softer ride over the bumps and moguls ordinarily encountered in travel, and added stability in turns.

It is a further objective of a suspension system of the invention to provide additional lateral support for the skis which will resist both inward and outward twist thereof created by centrifugal force in turns.

SUMMARY OF THE PRESENT INVENTION

Basically the invention comprises a transverse torsion bar in the front part of the snowmobile, means for attaching the torsion bar to the body of a snowmobile but permitting it to twist under applied torque, lever arms at each end of the torsion bar and links pivotally attached, respectively, to each ski and to the torsion bar lever arms at points laterally displaced from the steering axis of the skis.

A primary advantage of the anti-roll system of the invention is that it enables a softening of the leaf springs commonly employed on snowmobile skis, which is preferably accomplished by lengthening their stroke so as not to reduce their overall energy absorbing capability.

Another advantage of the invention is that it provides a more stable ride by reducing the roll of the snowmobile caused by differential deflection of the leaf springs when turning.

A further advantage of the invention, resulting from the angling of the links connecting the skis to the torsion bar lever arms, is that the lateral forces exerted upon the skis in a turn oppose and tend to cancel one another. Lateral displacement of the skis in a turn is thus reduced. This is particularly important, as will be explained, where the extended stroke of the leaf springs results in an increase in the vertical distance between the surface of the ski and the point where the leaf spring is connected to the snowmobile body through the steering spindle.

Other objectives, advantages, and various further features of novelty and invention will be pointed out or will occur to those skilled in the art from a reading of the following specification in conjunction with the accompanying drawings.

BRIEF DESCRIPTION OF THE DRAWINGS

FIG. 3 is a cut-away plan view of the torsion bar end and lever arm of FIG. 1 with its attaching hardware in section.

FIG. 4 is a cross-sectional side view of the attachment of a connecting link of the invention to a ski.

FIG. 5 is a top view of a connecting link of the invention.

FIG. 6 is a side view of a connecting link of the invention.

DETAILED DESCRIPTION OF THE DRAWINGS

Figure 1:
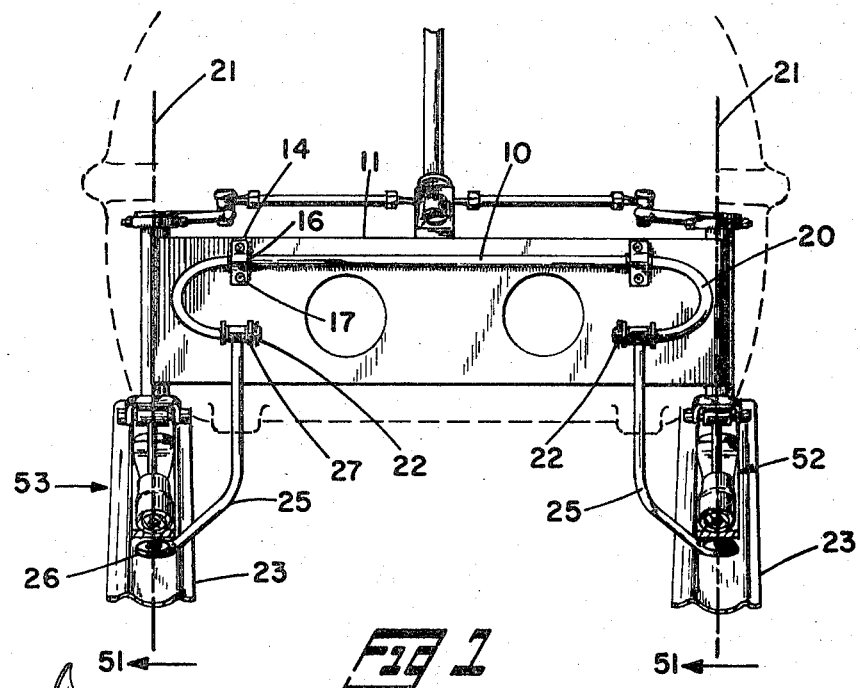
FIG. 1 is a view of the front portion of a snowmobile body illustrating an embodiment of the invention.
Figure 2:
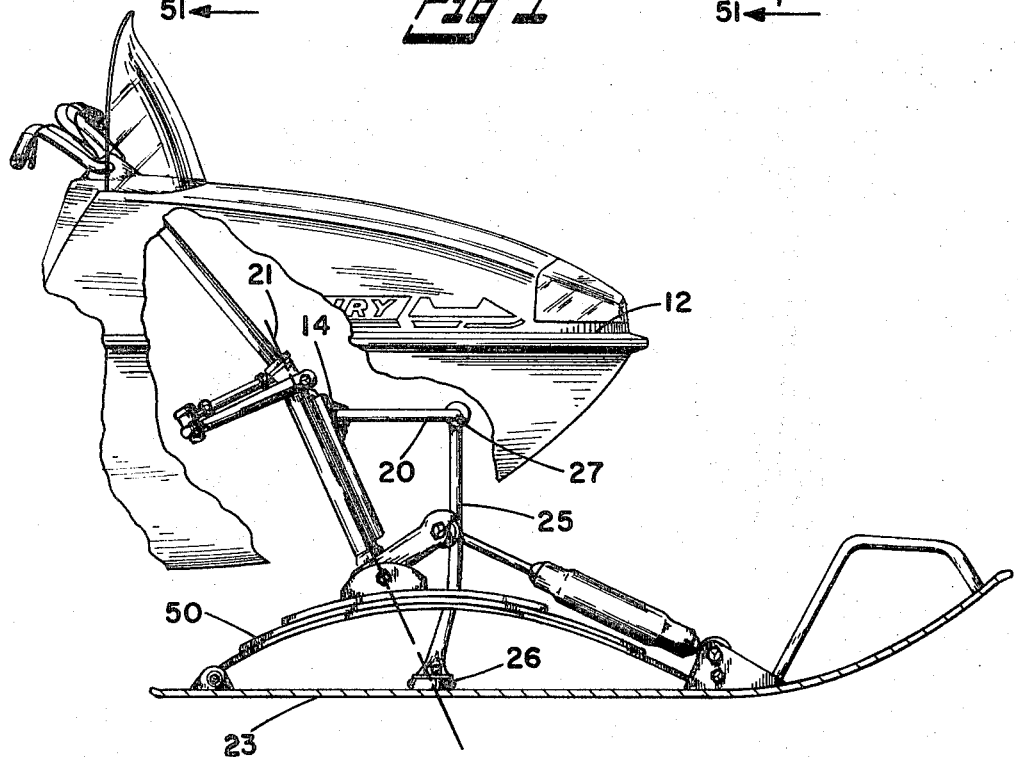
FIG. 2 is a side view of the installation illustrated in FIG. 1.

FIG. 1 illustrates an installation of the anti-roll bar system of the invention. A torsion bar 10, preferably made of spring steel, is attached to the forward face of a frame member 11 of the snowmobile body 12 (illustrated in phantom). The bar 10 may be attached to the frame 11 by brackets 14 comprising a rubber bushing 15 surrounding the bar 10 and a generally U-shaped clamp 16 having flanged ends 17 by which it is connected to the frame 11. The clamp 16 compresses the bushing 15 to tightly retain the bar 10. By placing the brackets 14 adjacent the curvature of the semi-circular lever arms 20 on the ends 22 of the torsion bar 10, lateral motion of the bar, which is undesirable, is effectively eliminated. It is anticipated that the bar 10 will not move within the bushing 15 beyond limits of flexibility provided by its resiliency.

The torsion bar 10 comprises a straight portion extending between the brackets 14, with end portions 20 curving inwardly through a semi-circular arc and terminating at a point generally forward of the connecting brackets 14. As illustrated in FIGS. 1 and 3, the semi-circular arms 20 terminate at a point considerably inside of the steering axis 21 of the two skis.

The skis 23 are tied to the torsion bar 10 by curved links 25. The lower end of each link is provided with an eye 27 which fits over a stud 28 extending upwardly from the body of the ski 23, and located generally on the steering axis 21 extended. A rubber bushing 30 resiliently supports the foot 26 of the link on the stud 28, permitting it to pivot about the stud 28 when the ski is turned. The rubber bushing 30 is sandwiched between a retaining washer 31 and a base plate 33 and the entire assembly is tightly retained on the stud 28 by a nut 32. It has been found convenient to attach the stud 28 to a base plate 33 and weld the base plate 33 to the top of the ski 23.

The upper end of the link 25 teminates in an eye 35 adapted to receive the end 22 of the torsion bar arm 20. The joint between the torsion bar arm 20 and the eye 35 of the link includes a sleeve 38 slidably fitted on to the bar 10. The sleeve 38 is fixed upon the bar 10 by pin 43, which connection prevents either rotational or axial movement of the sleeve 38. A rubber bushing 39 is compressed between the exterior of the sleeve 38 and the eye 35 of the link 25. The bushing is designed to prevent metal to metal contact, permit relative rotation between the eye 35 and the arm 20, and promote quiet operation.

A flange 41 is provided on the outer end of the sleeve 38, and the bushing 39 is retained on the sleeve 38 by a pair of washers 40 which slide over the sleeve 38 in a position on alternate sides of the bushing 39. The entire assembly is retained on the end of the arm 20 by the pin 43 which extends through a hole 42 in the end of the arm 20.

A particularly novel feature of the invention is the lateral offset between the point of attachment of the lower end of the link 25 to the ski 23, and the point of attachment of the upper end of the link 25 to the torsion bar arm 20. This lateral offset permits the above described linkage to resist both inward and outward lateral displacement of the skis with respect to the frame 11. This displacement results from lateral twisting of the leaf springs 50 under centrifugal forces encountered in a turn. In addition, the longitudinal leverage provided by the semi-circular arms 20 cause the lateral twisting forces exerted upon the respective skis to work against, and offset, one another. For example, with a snowmobile such as that depicted in FIG. 1 in a right turn, lateral forces will be exerted upon the skis 23 in the direction of the arrows 51. Under these conditions, the left ski assembly 52 will tend to move inwardly forcing its torsion bar arm 20 upwardly; however, the right ski 53 will tend to be displaced outwardly thus pulling down on the opposite torsion bar arm 20. With tighter turns, higher speeds, or higher vehicle c.g. the outside ski (52 for right hand turn) will experience more download and hence more sideload. In the extreme ski 53 will life off the ground (snow) and have no download or sideload. In this case the sideload on ski 52 will produce upward movement of the arm 20 causing upward movement of arm 20 on the right end of the torsion bar with consequent inward and upward movement of ski 53. Thus the stiffness of the right side leaf spring will supplement the torsional stiffness of the left side leaf spring in resisting the movement of the left ski to the right.

Of particular note is the fact that reduction of such lateral displacement of the skis under the chassis permits the use of a more flexible and longer stroke leaf spring structure. Applicant has found that by using the torsion bar linkage described it is possible to increase the stroke of the ski leaf springs by 50 percent, use springs with two-thirds the prior spring rate, and still provide adequate lateral support for the skis. This increase in the spring stroke with softer springs, together with the torsion bar system described results in a softer riding machine with increased stability.

In operation, the anti-roll bar system described will function to level the front of the snowmobile in a turn. Again taking the example of the right turn, the tendency of the machine will be to roll to the outside of the turn depressing the leaf spring of the ski assembly 52. This causes upward displacement of the associated end 22 of the torsion bar arm 20. This upward displacement is transmitted to the upper end of the link 25 associated with the ski assembly 53, resulting in upward displacement of the ski assembly 53 so that the front of the machine tends to remain level. Actually, there will still be some tilt in the machine due to the flexibility within the torsion bar 10 and the fact that upward displacement of the ski assembly 53 will be resisted at its leaf spring 50.

While the lever arms 20 of the illustrated embodiment extend forwardly of the torsion bar 10 such a configuration is not required to achieve the advantages of the invention. Any linkage which would effectively translate up and down and lateral movement of the skis into a twisting force on the bar 10 would provide the same beneficial effects. For example, the semi-circular arms 20 could curve aft from a more forward position and the ends thereof could be laterally displaced to the outside of the skis.

It will be noted that the steering axis 21 of the skis angles forwardly and downwardly, and that the links 25 extend downwardly and aft. Having the links 25 extend other than in the lateral plane of the steering axis has the added benefit of permitting the anti-roll bar linkage herein described to function to position the skis 23 in parallel when they are airborn; reducing the tendency for one ski to contact the running surface before the other.

While the principles of the invention have been described in connection with the above specific apparatus, it is to be clearly understood that this description is made only by way of example and not as a limitation to the scope of the invention.

I claim:

1. In a power driven vehicle having a frame, a pair of laterally spaced steerable skis, and spring suspension means attaching said skis to said frame, an improvement comprising an antiroll torsion bar stabilizing system, comprising:

a torsion bar attached to said frame, and means connecting each ski to said bar including a lever arm and means for connecting said lever arm to said bar, and means for connecting said ski to said lever arm including a link pivotally connected to and angling upwardly and laterally away from said skis; said linkage being operable to exert a twisting moment upon said bar in response to vertical or horizontal displacement of said skis.

2. The device of claim 1 wherein said link is pivotally connected to sad ski.

3. The device of claim 1 wherein said lever arms are an integral extension of said bar.

4. The device of claim 1 wherein said spring means comprises leaf spring means and means for attaching said leaf spring means to said frame and said skis.

5. The device of claim 1 wherein said link is pivotally connected to said lever arm.

6. The device of claim 5 wherein said torsion bar comprises a generally linear main body and a pair of lever arms extending outwardly therefrom, and said connecting means comprises means for pivotally connecting said links respectively to said lever arms.

7. In a snowmobile having a body, a pair of skis, and means steerably attaching said skis to said body including leaf spring suspension means for said skis, and means to pivot said skis about a generally upright axis, an improved anti-roll torsion bar stabilizing system comprising, a torsion bar attached to said body, and means for operatively connecting each of said skis to said torsion bar including, a link for each ski and means for pivotally attaching each link to each ski at first pre-selected points, and means for attaching said links to said torsion bar at second pre-selected points; said second pre-selected points being offset laterally from said first pre-selected points and said generally upright axis, whereby said system is responsive to relative vertical and horizontal displacement of said skis through said leaf spring suspension means with respect to said axis and the snowmobile body.

\* \* \* \* \*